United States Patent
Penn et al.

(10) Patent No.: US 7,611,247 B2
(45) Date of Patent: Nov. 3, 2009

(54) ILLUMINATION APERTURE FOR PROJECTION DISPLAY

(75) Inventors: Steven M. Penn, Plano, TX (US); D. Scott Dewald, Dallas, TX (US); Steven P. Krycho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 322 days.

(21) Appl. No.: 11/120,294

(22) Filed: May 2, 2005

(65) Prior Publication Data

US 2005/0264792 A1    Dec. 1, 2005

Related U.S. Application Data

(63) Continuation-in-part of application No. 10/331,518, filed on Dec. 30, 2002, now abandoned.

(60) Provisional application No. 60/344,251, filed on Dec. 28, 2001.

(51) Int. Cl.
  G03B 21/14  (2006.01)
  G03B 21/28  (2006.01)
  G02B 9/08   (2006.01)
  G02F 1/135  (2006.01)

(52) U.S. Cl. .............. 353/97; 353/31; 353/38; 353/81; 359/740; 349/30

(58) Field of Classification Search ........ 353/97, 353/31, 38, 81; 359/740, 739; 349/25, 30
See application file for complete search history.

(56) References Cited

U.S. PATENT DOCUMENTS

| | | | |
|---|---|---|---|
| 1,214,798 A | 2/1917 | Lehmann | |
| 5,155,596 A | 10/1992 | Kurtz et al. | |
| 5,442,414 A | 8/1995 | Janssen et al. | |
| 5,519,518 A | 5/1996 | Watanabe et al. | |
| 5,622,418 A * | 4/1997 | Daijogo et al. | 353/97 |
| 5,662,401 A | 9/1997 | Shimizu et al. | |
| 5,947,576 A | 9/1999 | Sato et al. | |
| 6,224,216 B1 | 5/2001 | Parker et al. | |
| 6,231,195 B1 | 5/2001 | Gutin | |
| 6,578,987 B1 | 6/2003 | Hough et al. | |
| 6,637,894 B2 * | 10/2003 | Dewald et al. | 353/97 |
| 6,649,435 B2 | 11/2003 | Liu et al. | |
| 7,182,469 B2 | 2/2007 | Dewald et al. | |
| 2002/0126264 A1 | 9/2002 | Dewald et al. | |
| 2003/0123029 A1 | 7/2003 | Penn | |
| 2003/0147052 A1 | 8/2003 | Penn et al. | |

\* cited by examiner

*Primary Examiner*—Diane I Lee
*Assistant Examiner*—Magda Cruz
(74) *Attorney, Agent, or Firm*—Charles A. Brill; Wade James Brady, III; Frederick J. Telecky, Jr.

(57) ABSTRACT

An optical system and method of increasing the contrast of a projected image. The optical system (1800) comprises a combination of aperture stops (1810, 1812) in at least one of the illumination and projection paths to filter scattered light and/or light prone to scatter into the projection aperture.

37 Claims, 5 Drawing Sheets

ILLUMINATION APERTURE FOR PROJECTION DISPLAY

This application is a Continuation-In-Part of application Ser. No. 10/331,518, filed 30 Dec. 2002 now abandoned, and Provisional Application No. 60/344,251, filed 28 Dec. 2001.

FIELD OF THE INVENTION

This invention relates to the field of optical systems, particularly to optical systems for projection display systems, more particularly to optical systems used with micromirror based projection display systems.

BACKGROUND OF THE INVENTION

Micromirror projection display systems are rapidly gaining acceptance in a wide variety of applications, from sub-three pound portable projectors to cinema-quality projectors. The cinema projectors provide the image quality of traditional film projectors, without the expense and degradation associated with filmstrip projection. Existing cinema projectors provide contrast ratios in excess of 1,000:1. What is needed is a method of increasing the contrast ratio of micromirror projectors.

SUMMARY OF THE INVENTION

Objects and advantages will be obvious, and will in part appear hereinafter and will be accomplished by the present invention that provides a method and system for increasing the contrast ratio of a display system.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE PREFERRED EMBODIMENTS

Figure 1:
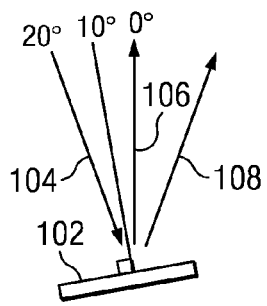
FIG. 1 is a schematic side view of a single micromirror element in a first deflected position showing the path of illumination light and reflected projection light.

A new method and system for projecting an image has been developed. The method and system use an asymmetric aperture stop in either the illumination or projection paths, or both, to control light scattering while minimizing the amount of desired a projection lens to block scattered light without blocking the desired projection light. Depending on the optical system and the degree to which light is scattered and diffracted in the display system, the disclosed method and system provide a contrast improvement. The disclosed method and system are particularly useful in spatial light modulator display systems, in particular in reflective spatial light modulator display systems—especially micromirror based display systems.

According to one embodiment of the present invention, a display system is provided. The display system comprising: a light source for providing a beam of light along an illumination path; a modulator on the illumination path for receiving the beam of light and selectively modulating the beam of light along a projection path; and a lens system on the projection path. The lens system comprising: at least one lens; and an asymmetric aperture stop receiving light from at least one of the at least one lenses.

According to another embodiment of the present invention, a method of projecting an image is provided. The method comprising: receiving an illumination light beam along an illumination path; selectively modulating the illumination light beam along a projection path in response to image data; focusing the selectively modulated light using a projection lens; and blocking a portion of light passing through the projection lens using an asymmetric aperture stop.

According to another embodiment of the present invention, a display system is provided. The display system comprising: a light source for providing a beam of light along an illumination path; a modulator device on the illumination path for receiving the beam of light and selectively modulating the beam of light along a projection path; and a lens system on the illumination path. The lens system comprising: at least one lens; and an aperture stop blocking a portion of the beam. The aperture is narrower in a direction toward the projection path than in a direction orthogonal to the projection path.

According to another embodiment of the present invention, a method of projecting an image is provided. The method comprising: receiving an illumination light beam along an illumination path; selectively modulating the illumination light beam along a projection path in response to image data; focusing the selectively reflected light using a projection lens; and blocking a portion of light in the illumination beam using an aperture that is narrower in a direction toward the projection path than in a direction orthogonal to the projection path.

According to another embodiment of the present invention, a display system is provided. The display system comprising: a light source for providing a beam of light along an illumination path; a modulator on the illumination path for receiving said beam of light and selectively modulating the beam of light along a projection path; a lens system on the projection path; and a lens system on the illumination path. The lens system on the projection path comprising: at least one projection lens; and an asymmetric aperture stop receiving light from at least one of said at least one projection lenses. The lens system on the illumination path comprising: at least one lens; and an illumination aperture stop blocking a portion of the beam, the illumination aperture being narrower in a direction toward the projection path than in a direction orthogonal to the projection path.

According to another embodiment of the present invention a method of projecting an image is provided. The method comprising: receiving an illumination light beam along an illumination path; selectively modulating the illumination light beam along a projection path in response to image data; focusing the selectively modulated light using a projection lens; blocking a portion of light in the illumination beam using an illumination aperture that is narrower in a direction toward the projection path than in a direction orthogonal to the projection path; and blocking a portion of light passing through the projection lens using an asymmetric aperture stop.

Figure 2:
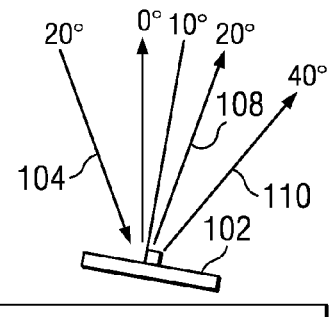
FIG. 2 is a schematic side view of a single micromirror element in a second deflected position showing the path of illumination light and reflected light.
Figure 3:
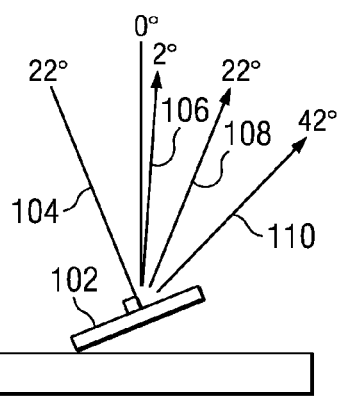
FIG. 3 is a schematic side view of a single micromirror element in a first deflected position showing the path of shifted illumination light and reflected projection light.

FIG. 1 is a schematic side view of a single micromirror element in a first deflected position showing the path of illumination light and reflected projection light. In FIG. 1, a single element or mirror 102 of a micromirror device is shown. Most useful micromirror devices have many mirrors, often on the order of one million. The mirror 102 of FIGS. 1-3 is operable to tilt 10° in one of two directions. The mirror 102 is tilted to a first position in FIG. 1. The first position shown in FIG. 1 is often called the "on" position since it causes light from a source to be reflected approximately normal to the surface of the micromirror array to a projection lens. The projection lens focuses the light onto an image plane such that the light from an "on" mirror creates a bright pixel.

In FIG. 1, the illumination path 104, the path of the light from a light source, strikes the micromirror at an angle of 20° relative to the normal of the mirror when it is not deflected. The mirror 102 is rotated about an axis perpendicular to the plane of FIG. 1 in a clockwise direction towards the illumination path 104 at an angle of one-half of the angle of the illumination path. The result is the light reflected by the on-state mirror is reflected along a path 106 normal to the plane of the device.

In addition to the light reflected by the mirror 102, light is reflected by the structures surrounding the mirror 102, including any aperture stop around the mirror array (not shown). Reflection by structures parallel to the plane of the array is considered specular reflection or flat state reflection and follows specular path 108.

In addition to the specular reflection and the light reflected by the deflected mirrors, light striking between the mirrors may be scattered by multiple reflections from structures under the mirrors and the underside of the mirrors. Light is also diffracted by the edges of the structures. Scattered light and diffracted light exit the micromirror array in virtually all directions. The scattered light and diffracted light reaching the projection lens tend to raise the black level of the projected image. This lowers the contrast ratio of the image since the contrast ratio is the ratio of a maximum brightness pixel and a minimum brightness pixel.

FIG. 2 is a schematic side view of the single micromirror 102 of FIG. 1 in a second deflected position. In FIG. 2, the mirror is rotated 100 in a direction opposite the "on" direction shown in FIG. 1. In FIG. 2, light at a 20° illumination angle is reflected by the "off-state" pixel at an angle 40° away from the normal angle. Comparing FIGS. 1 and 2 shows a 40° separation between on-state light and off-state light, and a 20° separation between illumination light and on-state light.

Separation between the illumination path 104 and the projection path 106 is necessary to prevent interference of the light source optics and the projection optics. Separation between the projection path 106 and the off-state light path 110, or dump light path, is necessary to allow the projection optics to collect the on-state light while avoiding the off-state light. The projection optics should also avoid collecting the specularly reflected light, the scattered light, and the diffracted light.

FIG. 3 is a schematic side view of the single micromirror element 102 in the first deflected position showing the illumination light path shifted away from the device normal in the illumination direction. Typically, a micromirror that is capable of rotating 10° in either direction is illuminated at an angle of 22°. Keeping the axis of the projection lens normal to the micromirror array when using a 22° illumination angle in combination with a 10° micromirror tilt angle provides a separation between the projection lens and the illumination path of 22°, a 22° separation between the projection lens and the specular reflections, and a 42° separation between the projection lens and the off-state light. This increased separation has been found to reduce the amount of specular reflection entering the pupil of the projection lens.

Figure 4:
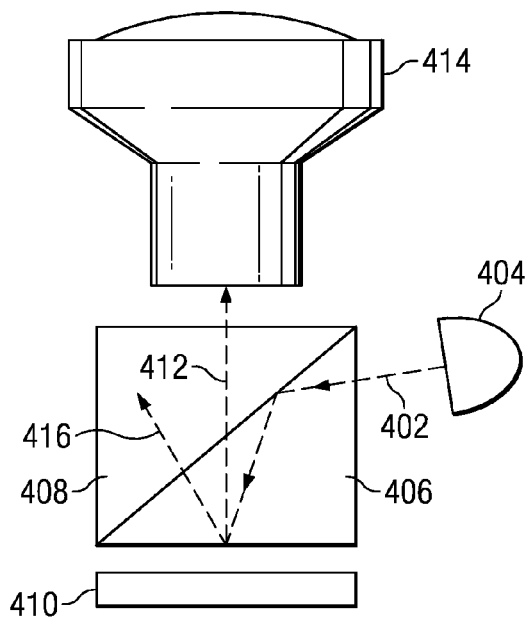
FIG. 4 is a side view of a portion of a display system showing illumination and projection paths passing through a prism assembly.

One common method of further separating the projection and illumination paths is shown in FIG. 4. FIG. 4 is a side view of a portion of a display system showing illumination and projection paths passing through a prism assembly. Light 402 from a light source 404 enters a first prism 406 and is reflected at an interface between the first prism 406 and a second prism 408. The reflected light travels to the micromirror array 410 and is selectively reflected by the array depending on the state of the mirrors. Light reflected by the on-state mirrors travels along path 412 and, because it strikes the interface at a steeper angle than the illumination light, passes through the interface and enters a projection lens 414. Light reflected by the off-state mirrors follows path 416 and does not enter the pupil of the projection lens 414.

Figure 5:
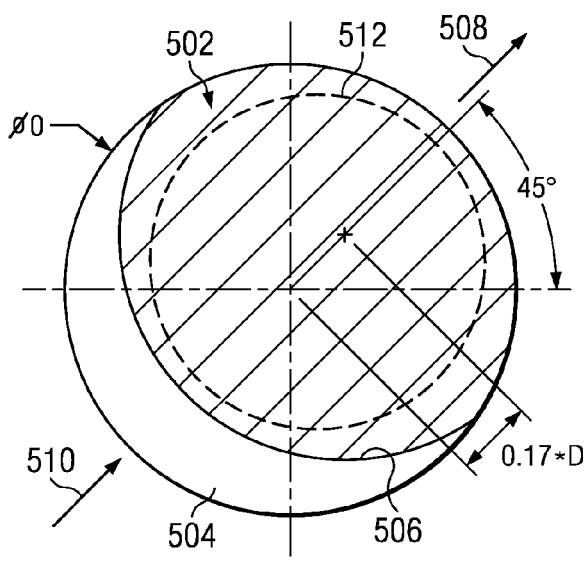
FIG. 5 is a plan view of a pupil in a projection lens showing one embodiment of an asymmetric aperture stop.

FIG. 5 is a plan view of a pupil of a projection lens showing one embodiment of an asymmetric aperture stop. In FIG. 5, the aperture stop forms an asymmetric aperture, shown by cross-hatched region 502. The asymmetric aperture has a predominately circular shape, but a portion 504 of the circular aperture is blocked. The aperture stop may be formed using multiple components, including lens holders or other components of the lens such as the lens barrel.

In a first embodiment, the blocked region is a crescent shape with an inside edge 506 having a radius equal to the radius of the circular portion of the aperture. The center of curvature of the inside edge is shifted away from the center of the circular aperture by approximately 17% of the diameter of the circular portion of the aperture in a direction toward the specular reflection 508 and away from the illumination path 510.

Figure 6:
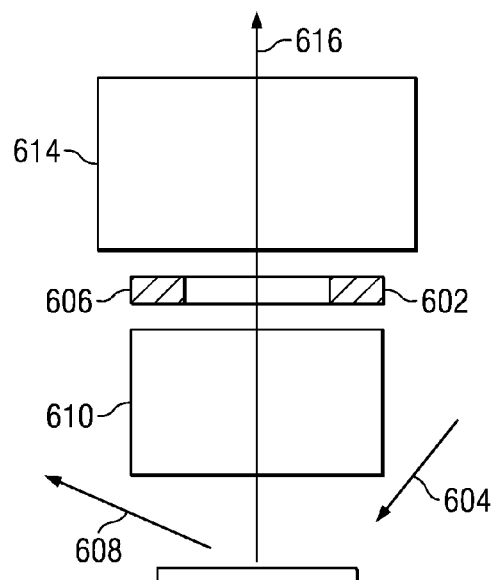
FIG. 6 is a side view of a portion of a display system showing an orientation of the asymmetrical aperture stop of FIG. 5.

As shown in FIG. 6, this arrangement orients the blocking portion 602 of the aperture stop toward the illumination path 604, and the thinner portion 606 of the aperture stop toward the specular reflection path 608. Also shown in FIG. 6 are a first lens group 610 located between the aperture stop and the spatial light modulator 612 and a second lens group 614 on the projection path 616 on an opposite side of the aperture stop from the first lens group 610. Both of the lens groups 610, 614 may comprise a single lens or more than one lens.

The asymmetric aperture stop described above provides a 20-30% improvement in the contrast ratio of a projected image. Returning to FIG. 5 it is seen that the majority of the on-state projection light from the modulator array passes through a region 512 that is not centered in the projection lens. This offset, while not necessary to the operation of this present invention, is caused by the increased illumination angle of FIG. 3 which results in the projection lens operating in a slightly offset mode. The asymmetric aperture 502 is able to block a significant portion of the diffracted light using the blocked region 504, without blocking much of the desired projection light passing through the remainder of the aperture. The result is that dark regions of the image become significantly darker, while light regions remain about the same. The same effect occurs without the offset illumination shown in FIG. 3, but to a lesser extent.

Figure 7:
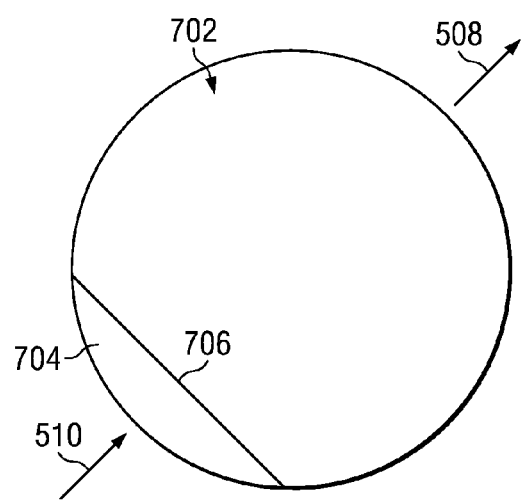
FIG. 7 is a plan view of a pupil in a projection lens showing another embodiment of an asymmetric aperture stop.

FIG. 7 is a plan view of a pupil in a projection lens showing another embodiment of an asymmetric aperture 702. In FIG. 7, a circular aperture is blocked over region 704. As with the other examples described herein, the edge of the aperture stop need not be circular. For example, the blocked region 704 of FIG. 7 is defined by a straight edge 706.

Figure 8:
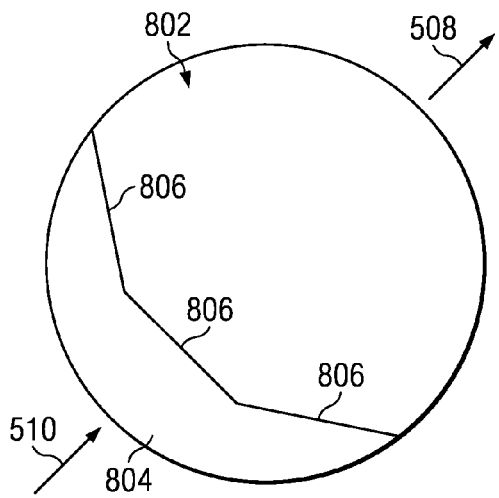
FIG. 8 is a plan view of a pupil in a projection lens showing another embodiment of an asymmetric aperture stop.

FIG. 8 is a plan view of a pupil in a projection lens showing another embodiment of an asymmetric aperture 802. In FIG. 8, the otherwise circular aperture is blocked over region 804. The blocked region 804 is defined by three straight edges 806 and the circular perimeter of the basic aperture.

Figure 9:
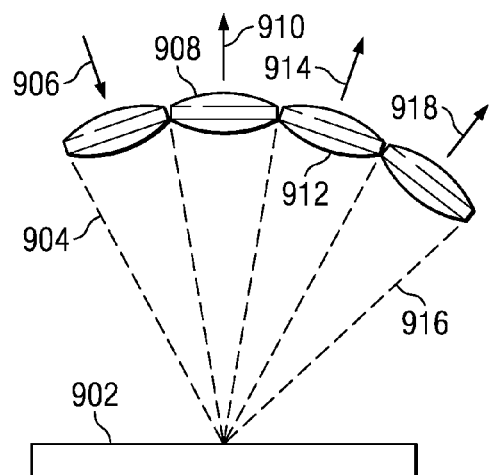
FIG. 9 is a schematic side view showing an illumination cone and three reflection light cones.

Another embodiment of the present invention alters the illumination beam to further prevent scattered light from entering the projection pupil. FIG. 9 shows four light cones impinging on or emanating from a micromirror array 902. In FIG. 9, an illumination cone 904 is centered on the chief illumination ray 906. As described above, the illumination angle typically is either equal to or slightly greater than the tilt angle of the mirror array. For simplicity, the illumination angle will be assumed to be equal to the tilt angle in the following explanation. For example, the illumination chief ray 906 is assumed to strike the mirror array from an angle of 10° relative to the array normal when the tilt angle of the mirrors is 10°.

The "on" state reflected light exits the array in light cone 908 centered around the chief on ray 910 which is normal to the array. Light reflecting from either undeflected mirrors or from flat structures on the array substrate exits the mirror array in specular cone 912 centered about chief specular ray 914 which is displaced 10° from array normal. Light reflected by the "off" state mirrors exits the array in light cone 916 which is centered about the chief off ray 918 which is 40° relative to array normal.

Figure 10:
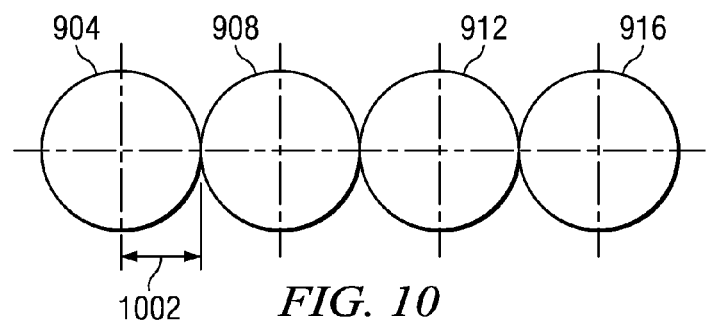
FIG. 10 is a plan view showing the four cones of light from FIG. 9.

FIG. 10 is a plan view illustrating the four light cones of FIG. 9. The plane of FIG. 10 is a curved surface whose axis is the axis of rotation of the micromirror in FIG. 9. In FIG. 10, each cone abuts, but does not overlap. In a typical DMD projection system with a 10° illumination angle, the illumination cone may be approximately an f/3 cone, which has a 19° solid cone angle, or a 9.5° half angle 1002.

Light scattered by the flat portions of the array falls in and around cone 912. Any light scattered by the array in such a way that it is reflected or diffracted outside the flat state cone 912 in the direction closer to the normal of the array may be located in the on state cone 908 which would cause it to enter the projection lens and degrade the image created by the display system. Likewise, off light that is scattered well away of the off state cone may also enter the projection lens pupil and degrade the image.

In addition to light scattered by the array, the physical dimensions of the array also lead to some commingling of the illumination and projection beams. Since the array has a diagonal dimension on the order of one inch, or 2.5 centimeters, there can be significant overlap between the various light cones emanating from one portion of the array and the light cones emanating from another portion of the array.

Figure 11:
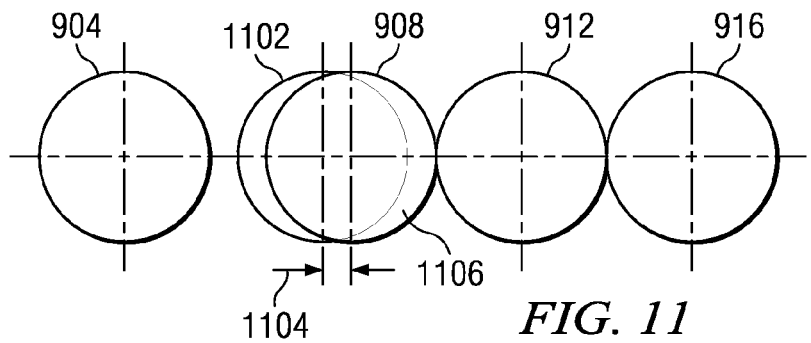
FIG. 11 is a plan view showing the four cones of light from FIG. 9 under an offset illumination condition.

Since it is the light rays having angles closest to the projection axis that are most problematic, the offset illumination angle approach illustrated in FIG. 3 has been used to improve the separation between the on and off state light. Not only does the offset illumination approach separate the illumination and projection apertures, assuming the projection lens remains the same it also filters out a part of the projection beam most likely to degrade image contrast. FIG. 11 illustrates this filtering.

In FIG. 11, the illumination cone 904 has been shifted to the left as described in FIG. 3. As a result, the projection "on state" cone 908 is shifted to the right by an amount shown as 1104. The flat state cone 912 and the "off state" cone 916 are also shifted to the right. Since the reflected cones 908, 912, 916 are all shifted in the off direction an equal amount, the f/3 cones still abut. In FIG. 11, the projection cone 1102 accepted by the projection lens has not shifted. As a result, a portion of the on state light, shown as crescent 1106, fails to enter the projection lens. This on state light is most likely to include diffracted flat state light and miscellaneous scattered light. By excluding this crescent from the light used to form the image, the contrast of the projected image is increased.

While the offset illumination angle typically improves the contrast ratio of the image, in some situations the offset illumination results in an unacceptable loss of brightness and image uniformity.

Figure 12:
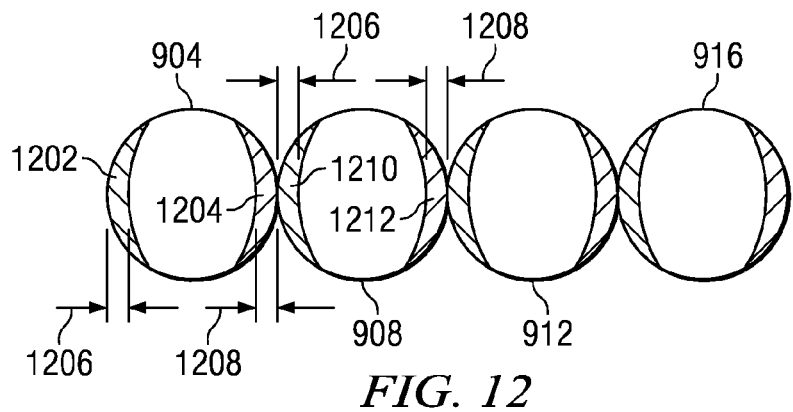
FIG. 12 is a plan view showing the four cones of light from FIG. 9 showing the use of illumination aperture stops to block light that is prone to scattering into and within the on state cone.

FIG. 12 illustrates another embodiment of the present invention. In FIG. 12, one or two aperture stops are located in the illumination paths. A first aperture stop 1202 blocks illumination light from angles farthest from the projection axis. A second aperture stop 1204 blocks illumination light from angles closest to the projection axis. Either of the two aperture stops may be used independently, or the two may be combined in a single aperture stop. The aperture stops may be reflective to return the blocked light to the illumination source where some of the blocked light may be re-emitted along a path through the unblocked portion of the illumination cone 904.

The aperture stops 1202, 1204 remove light from the illumination path and have a similar effect on the apertures in the projection path. By removing the light from the illumination path, the light does not have the opportunity to scatter or diffract on the mirror surface or to be scattered by the optical components, such as lens glass, the modulator window, and an array aperture stop. Although the light from regions 1210 and 1212 is removed by the two aperture stops 1204, 1202, placing aperture stops in the projection path has the additional effect of removing any stray light scattered by the modulator and related optics. The shape of the blocked portion 1210 of the projection cone 908 nearest the illumination cone 904 is determined by aperture stop 1204. Likewise, the shape of the blocked portion 1212 of the projection cone farthest from the illumination cone is determined by the aperture stop 1202.

As described above, the aperture stops may be formed in a wide variety of shapes. According to one embodiment, the region blocked by the aperture stop is a crescent shape with an inside edge having a radius equal to the radius of the circular portion of the aperture. The center of curvature of the inside edge is shifted away from the center of the circular aperture by approximately 17% of the diameter of the circular portion of the aperture.

The two aperture stops 1202 and 1204 need not be either the same size or the same shape. Thus, the four aperture stops, 1202, 1204, 1210, 1212 in the illumination and projection paths may all be different sizes and shapes—although the four aperture stops may be identical.

Figure 13:
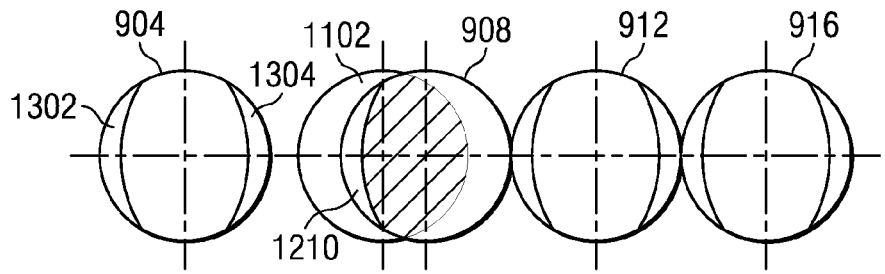
FIG. 13 is a plan view showing the four cones of light from FIG. 9 showing the use of illumination aperture stops to block light that is prone to scattering into and within the on state cone under an offset illumination condition.

FIG. 13 shows the application of the illumination aperture stops and offset illumination. In FIG. 13, two aperture stops 1302, 1304 are located in the illumination path. The two aperture stops block light from reaching the modulator, and therefore from all three of the reflected light cones 908, 912, 916. The offset of the illumination cone provides additional margin between the acceptance cone 1102 of the projection lens and the flat state cone 912 and off state cone 916. In FIG. 13, the offset shifts the on state cone far enough that an aperture stop in the projection path between the on state light cone 908 and the flat state light cone is not used.

Figure 14:
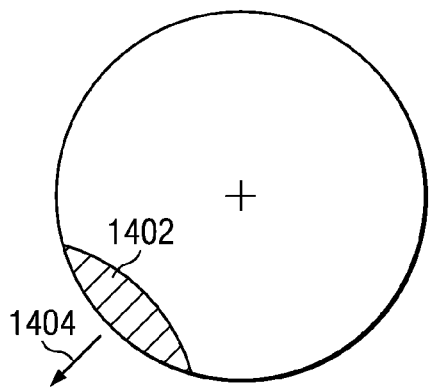
FIG. 14 is a plan view of a pupil of an illumination path showing an aperture stop according to one embodiment of the present invention in which the aperture is narrower in one direction toward a projection path than in another direction orthogonal to the projection path.

As mentioned above, the aperture stop in the illumination path need not match the size or shape of the aperture stop in the projection path. FIGS. 14 through 17 illustrate various embodiments of illumination apertures according to embodiments of the present invention. In FIG. 14, a curved aperture stop 1402 blocks a portion of the illumination light. The portion blocked is on the side of the illumination pupil farthest from the projection path of the display system. FIG. 14 is a plan view cutting across the illumination path through the illumination pupil. Light traveling along the illumination path strikes the spatial light modulator, and is reflected out of the plane of the modulator along a path in the direction shown by array 1404. Thus, the aperture stops of FIGS. 14 through 17 all create an aperture that is narrower in a direction toward the projection path than in a direction orthogonal to the projection path.

The aperture stop 1402 is reflective, so any light striking the aperture stop is reflected toward the illumination source where it has the potential of being recycled. The aperture stop 1402 of FIG. 14 is marginally effective in improving the contrast of the projected image.

Figure 15:
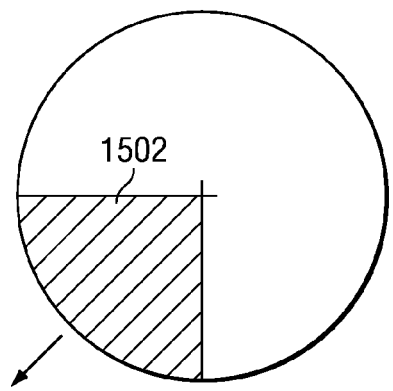
FIG. 15 is a plan view of a pupil of an illumination path showing an aperture stop according to one embodiment of the present invention in which the aperture is narrower in one direction toward a projection path than in another direction orthogonal to the projection path.

FIG. 15 illustrates another embodiment of a projection aperture. In FIG. 15, one fourth of the entire illumination pupil is blocked by a reflective aperture stop 1502. The aperture stop 1502 of FIG. 15 provides good contrast improvement.

Figure 16:
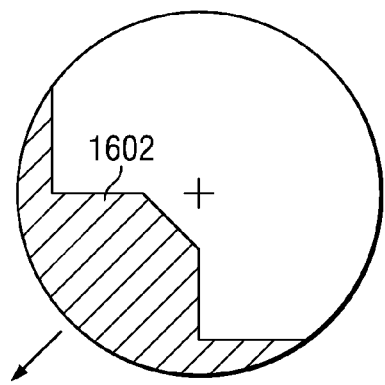
FIG. 16 is a plan view of a pupil of an illumination path showing an aperture stop according to one embodiment of the present invention in which the aperture is narrower in one direction toward a projection path than in another direction orthogonal to the projection path.

FIG. 16 illustrates another embodiment of a projection aperture stop 1602. The aperture stop 1602 of FIG. 16 includes a large portion of the aperture stop 1502 of FIG. 15, with the addition of two extensions along the edges of the pupil. The extensions may be straight as shown, or may be curved. One embodiment uses curved extensions that match the aperture stop used in the projection path described above.

Figure 17:
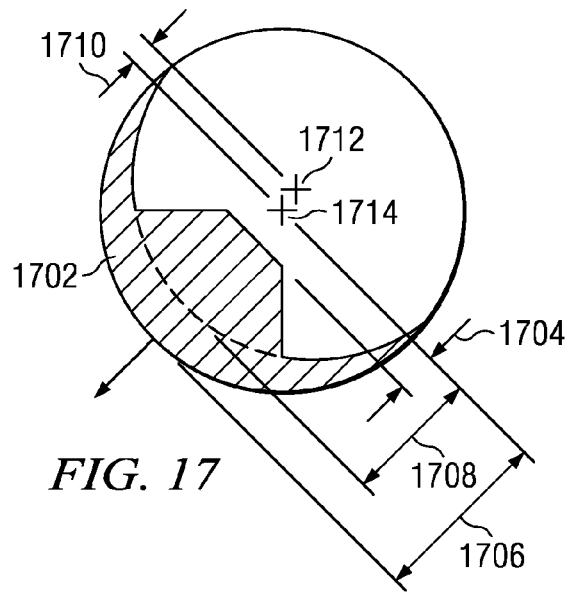
FIG. 17 is a plan view of a pupil of an illumination path showing an aperture stop according to one embodiment of the present invention in which the aperture is narrower in one direction toward a projection path than in another direction orthogonal to the projection path.

FIG. 17 illustrates another embodiment of a projection aperture stop 1702. While each aperture is a tradeoff between image brightness and image contrast, the aperture stop 1702 of FIG. 17 provides an exceptionally beneficial tradeoff when used in a micromirror display system. The reflective aperture stop 1702 blocks one quarter of the pupil, as did aperture stop 1502 of FIG. 15, except for a portion closest to the center of the pupil. The aperture stop 1702 does not encroach closer to the center of the pupil than a distance 1704 equal to one-fourth the radius 1706 of the illumination pupil.

As in FIG. 16, the aperture stop 1702 of FIG. 17 includes extensions on each side around the edge of the illumination pupil. The extensions of aperture stop 1702 follow a curve that remains one-half of the pupil radius away from the pupil center at the nearest point 1708. The aperture stop 1702 of FIG. 17 is also shifted relative to the chief ray of the illumination path. The distance 1710 by which the chief illumination ray 1712 misses the center of the circular aperture stop 1714 is equal to and 2 to 3 degree shift in the illumination path away from the projection path.

Figure 18:
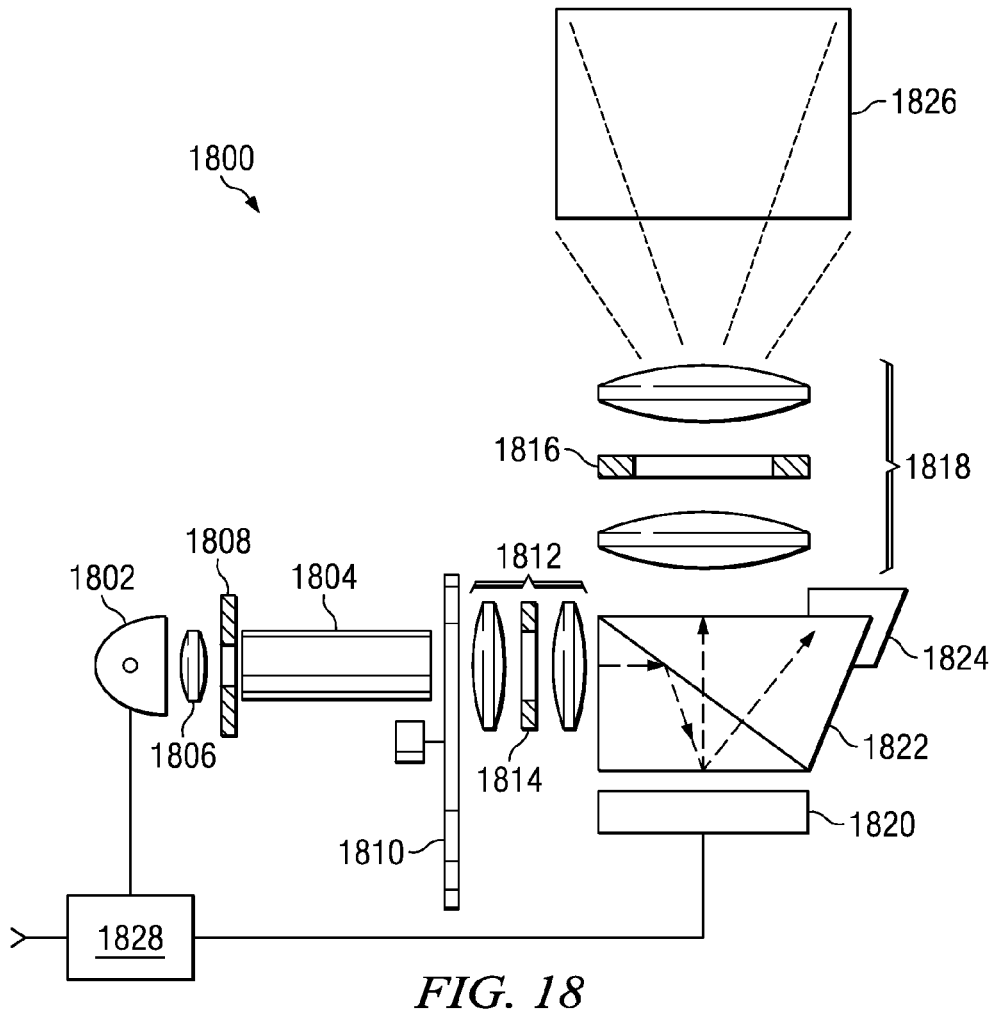
FIG. 18 is a schematic view of a micromirror-based projection system utilizing optical systems according to at least one embodiment of the present invention including apertures in an illumination path that are narrower in one direction toward a projection path than in another direction orthogonal to the projection path.

FIG. 18 is a schematic view of a micromirror-based projection system 1800 utilizing the one embodiment of the optical components and methods described herein. In FIG. 18, light from light source 1804 is focused on the entrance pupil of an integrating rod 1804 by lens group 1806. The entrance pupil of the integrating rod 1804 is surrounded by a reflective aperture stop 1808. Light striking the reflective aperture stop 1808 is returned to the light source. The integrating rod 1804 homogenizes the light passing through it. Light exiting the integrating rod 1804 passes through a color wheel 1810—which may be a scrolling color wheel or other type of recycling color wheel.

The light passing through the color wheel 1810 is focused by lens group 1812. As described above, lens group 1812 has one or more aperture stops, shown as a single aperture stop 1814 in FIG. 18. Alternative embodiments may use a separate aperture stop on either side of the illumination cone, or may rely on a single aperture stop on either side of the illumination pupil. Lens group 1812 focuses the illumination light onto a spatial light modulator 1820 through a TIR prism assembly 1822. The off state light and the flat state light are directed to a light dump 1824 which absorbs the light.

On state light exits the TIR prism assembly 1822 and enters the projection lens 1818. In the projection lens 1818 an aperture stop 1816 blocks a portion of the light, preventing it from passing through the lens to the image plane 1822. As described above, aperture stop 1816 typically block more of the light from the illumination side of the projection light cone than light from the opposite said of the projection light cone. Alternate embodiments may forego the use of a projection lens aperture stop and rely entirely on the illumination aperture stops 1814. Controller 1828 provides image data and control signals to the spatial light modulator 1820 to control the modulation of the illumination light in order to form an image on the image plane 1826.

Figure 19:
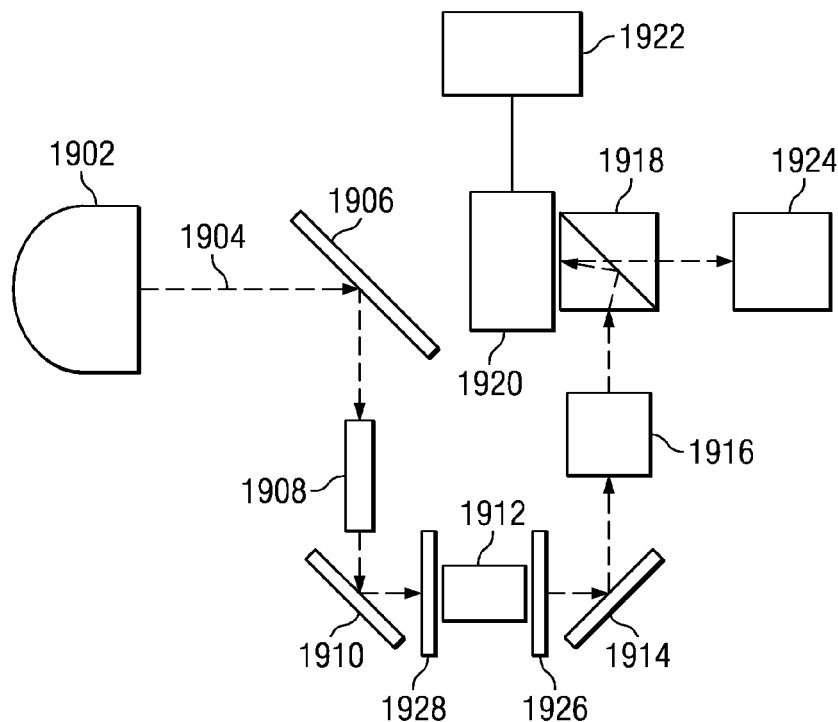
FIG. 19 is a schematic view of a three micromirror-based projection system utilizing optical systems according to at least one embodiment of the present invention including apertures in an illumination path.

FIG. 19 is a schematic view of a three micromirror-based projection system utilizing optical systems according to at least one embodiment of the present invention including apertures in an illumination path. Additional apertures may be used in the projection path instead of, or in addition to the apertures in the illumination path.

Three micromirror projection systems often are used in large-screen cinema applications where very bright, very high-quality images are required. Because existing theaters are designed to utilize filmstrip projectors, the light path of the micromirror projector is folded in a way that optimizes its compatibility with the existing light sources and projection booths. Typically this requires maintaining a projection light path that is on the same axis as the illumination light path from the light source. The typical cinema projector is designed to bolt on to the front of the light source cabinet in the same manner as the traditional film-strip projectors.

In FIG. 19, the light source 1902 provides a beam of light 1904 traveling along a first path to a first fold mirror 1906. The first fold mirror 1906 typically is a cold mirror that reflects the visible light and passes the infrared light. Separating and discarding the infrared light reduces the heating of the projector components.

The light source 1902 reflector, with or without additional optical components, focuses the illumination light on the input face of an integrating rod 1908. The integrating rod 1908 homogenizes the illumination light to ensure sufficiently even illumination across the eventual image. Light from the integrating rod 1908 is reflected by a second fold mirror 1910 and travels to illumination optics 1912. The illumination optics 1912 focus the light from the integrating rod 1908 as it travels to a third fold mirror 1914 and collimating optics 1916.

Light from the collimating optics 1916 enters a TIR prism 1918 where it is reflected at the TIR interface towards a color splitting prism assembly 1920. The color splitting prism assembly 1920 includes the three micromirror arrays which modulate the illumination light in response to signals received from the controller 1922.

The modulated light passes through the color splitting prism assembly 1920 a second time before passing through the TIR prism and being projected onto an image plane by projection lens 1924. While FIG. 19 and the accompanying text describe one embodiment of a three micromirror array projector, many alternative architectures and designs are possible.

Two locations for the aperture plate 1926 and 1928 are shown in FIG. 19. Aperture stop 1926 is located after the illumination optics 1912 and before the third fold mirror. In some projector designs, the illumination light bundle at aperture stop 1926 is collected in a manner that makes it optically advantageous to locate the aperture stop 1926 in this location.

Aperture stop 1928 illustrates an alternative location for the aperture. In the typical three micromirror cinema projectors, both aperture stop 1926 and aperture stop 1928 are located in positions that make retrofit of existing micromirror projectors possible as both locations provide adequate mechanical clearance for the aperture stop.

Figure 20:
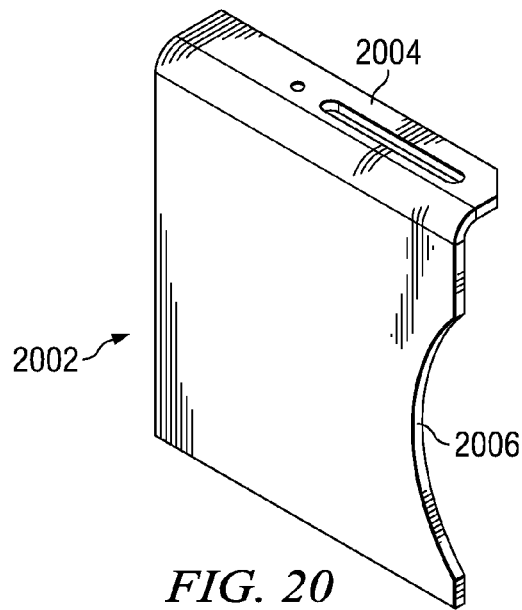
FIG. 20 is a perspective view of an aperture plate.

FIG. 20 is a perspective view of an aperture plate 2002. Aperture stop 2002 may be added to existing projectors as an after-market upgrade. In FIG. 20, the aperture plate 2002 is formed from a thin sheet, typically a 0.125 inch thick piece of aluminum that has been black anodized to minimize reflection. The aperture stop 2002 for a cinema system is approximately 4 inches square, and includes a slot 2004 to allow its position to be adjusted in the projection system. The position of the aperture plate 2002 may be adjusted manually or automatically, either as a static adjustment or dynamically during operation of the projector. As the position is adjusted, the contrast ratio of the projected image can be increased by up to approximately 25%.

Adjustment of the aperture is based on a variety of factors, including the ambient light in the display room, the image content being projected, the available light from the lamp console, and the manner in which the original film material was transferred to the digital domain.

Figure 21:
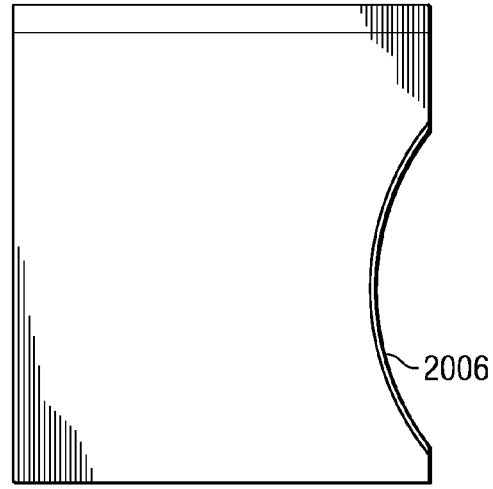
FIG. 21 is a plan view of the aperture plate of FIG. 20.

The curved edge 2006 of the aperture plate 2002 has a diameter of approximately 4.5 inches and extends approximately 0.5 inches into the aperture plate 2002 from the edge closest the light path. The circular edge may be beveled, for example at an angle of 75° relative to the plane of the aperture stop, to minimize the diffraction of the light passing through the aperture. FIG. 21 is a plan view of the aperture plate 2002 of FIG. 20.

Thus, although there has been disclosed to this point a particular embodiment for a high contrast lens, display system, and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. § 112, paragraph six.

What is claimed is:

1. A display system comprising:
   a light source for providing a beam of light along an illumination path;
   a modulator device on said illumination path for receiving said beam of light and selectively modulating said beam of light along a projection path;
   a lens system on said illumination path, said lens system comprising:
      at least one lens; and
      an aperture stop blocking a portion of said beam, said aperture stop forming an aperture that is narrower in a direction toward said projection path than in a direction orthogonal to said projection path; and
   at least two fold mirrors on said illumination path, said aperture stop located after a fold mirror without any intervening lenses.

2. The display system of claim 1, said aperture stop forming a predominately circular aperture, said aperture having at least one side portion thereof blocked by said aperture stop.

3. The display system of claim 2, said side portion comprising a crescent shaped portion.

4. The display system of claim 2, said side portion comprising a crescent shaped portion encroaching approximately 17% into said aperture.

5. The display system of claim 1, comprising at least one lens on said illumination path following said aperture stop on said illumination path.

6. The display system of claim 1, said at least one lens comprising:
   a first lens group on said illumination path between said modulator and said aperture stop; and
   a second lens group on said illumination path on an opposite side of said aperture stop from said first lens group.

7. The display system of claim 1, said aperture stop comprising a circular portion and a blocked portion.

8. The display system of claim 1, said modulator comprising a reflective spatial light modulator.

9. The display system of claim 1, said modulator comprising a reflective liquid crystal modulator.

10. The display system of claim 1, said modulator comprising a micromirror array.

11. A method of projecting an image, the method comprising:
   receiving an illumination light beam along an illumination path;
   selectively modulating said illumination light beam along a projection path in response to image data;
   focusing said selectively reflected light using a projection lens;
   blocking a portion of light in said illumination beam using an aperture stop to form an aperture that is narrower in a direction toward said projection path than in a direction orthogonal to said projection path; and
   folding said illumination path at least twice, at least one fold located before said aperture stop without any intervening lenses.

12. The method of claim 11, said blocking a portion of light comprising:
   blocking said portion using an aperture stop forming a predominately circular aperture having at least one offset blocking region.

13. The method of claim 12, said blocking a portion of light comprising:
   blocking said portion using an aperture stop forming a predominately circular aperture having at least one offset blocking region wherein said blocking region is a crescent shaped region.

14. The method of claim 12, said blocking a portion of light comprising:
   blocking said portion using an aperture stop forming a predominately circular aperture having at least one offset blocking region wherein said blocking region is a crescent shaped region having a radius equal to a radius of said circular aperture and a maximum thickness equal to 17% of a diameter of said circular aperture.

15. A display system comprising:
   a light source for providing a beam of light along an illumination path;
   a modulator on said illumination path for receiving said beam of light and selectively modulating said beam of light along a projection path;
   a lens system on said projection path, said lens system on said projection path comprising:
      at least one projection lens; and
      an asymmetric aperture stop receiving light from at least one of said at least one projection lenses;
   a lens system on said illumination path, said lens system on said illumination path comprising:
      at least one lens; and
      an illumination aperture stop blocking a portion of said beam, said illumination aperture stop forming an aperture that is narrower in a direction toward said projection path than in a direction orthogonal to said projection path; and
   at least two fold mirrors on said illumination path, said aperture stop located after a fold mirror without any intervening lenses.

16. The display system of claim 15, said asymmetric aperture stop forming a predominately circular aperture, said aperture having a side portion thereof blocked by said aperture stop.

17. The display system of claim 16, said side portion comprising a crescent shaped portion.

18. The display system of claim 16, said side portion comprising a crescent shaped portion encroaching approximately 17% into said aperture.

19. The display system of claim 15, comprising at least one lens on said projection path following said asymmetric aperture stop on said projection path.

20. The display system of claim 15, said at least one projection lens comprising:
   a first lens group on said projection path between said modulator and said asymmetric aperture stop; and
   a second lens group on said projection path on an opposite side of said asymmetric aperture stop from said first lens group.

21. The display system of claim 15, said asymmetric aperture stop comprising a circular portion and a blocked portion.

22. The display system of claim 15, said modulator comprising a reflective spatial light modulator.

23. The display system of claim 15, said modulator comprising a reflective liquid crystal modulator.

24. The display system of claim 15, said modulator comprising a micromirror array.

25. The display system of claim 15, said illumination aperture stop forming a predominately circular aperture, said aperture having at least one side portion thereof blocked by said illumination aperture stop.

26. The display system of claim 25, said side portion comprising a crescent shaped portion.

27. The display system of claim 25, said side portion comprising a crescent shaped portion encroaching approximately 17% into said illumination aperture.

28. The display system of claim 15, comprising at least one lens on said illumination path following said illumination aperture stop on said illumination path.

29. The display system of claim 15, said at least one lens comprising:
   a first lens group on said illumination path between said modulator and said illumination aperture stop; and
   a second lens group on said illumination path on an opposite side of said illumination aperture stop from said first lens group.

30. The display system of claim 15, said illumination aperture stop comprising a circular portion and a blocked portion.

31. A method of projecting an image, the method comprising:
   receiving an illumination light beam along an illumination path;
   selectively modulating said illumination light beam along a projection path in response to image data;
   focusing said selectively modulated light using a projection lens;
   blocking a portion of light in said illumination beam using an illumination aperture stop to form an aperture that is narrower in a direction toward said projection path than in a direction orthogonal to said projection path;
   folding said illumination path at least twice, at least one fold located before said aperture stop without any intervening lenses; and
   blocking a portion of light passing through said projection lens using an asymmetric aperture stop.

32. The method of claim 31, said blocking a portion of light passing through said projection lens comprising:
   blocking said portion using an asymmetric aperture stop forming a predominately circular aperture having an offset blocking region.

33. The method of claim 32, said blocking a portion of light passing through said projection lens comprising:
blocking said portion using an asymmetric aperture stop forming a predominately circular aperture having an offset blocking region wherein said blocking region is a crescent shaped region.

34. The method of claim 32, said blocking a portion of light passing through said projection lens comprising:
blocking said portion using an asymmetric aperture stop forming a predominately circular aperture having an offset blocking region wherein said blocking region is a crescent shaped region having a radius equal to a radius of said circular aperture and a maximum thickness equal to 17% of a diameter of said circular aperture.

35. The method of claim 31, said blocking a portion of light in said illumination beam comprising:
blocking said portion using an illumination aperture stop forming a predominately circular aperture having at least one offset blocking region.

36. The method of claim 31, said blocking a portion of light in said illumination beam comprising:
blocking said portion using an illumination aperture stop forming a predominately circular aperture having at least one offset blocking region wherein said blocking region is a crescent shaped region.

37. The method of claim 31, said blocking a portion of light in said illumination beam comprising:
blocking said portion using an illumination aperture stop forming a predominately circular aperture having at least one offset blocking region wherein said blocking region is a crescent shaped region having a radius equal to a radius of said circular aperture and a maximum thickness equal to 17% of a diameter of said circular aperture.

* * * * *

UNITED STATES PATENT AND TRADEMARK OFFICE
CERTIFICATE OF CORRECTION

PATENT NO. : 7,611,247 B2 Page 1 of 1
APPLICATION NO. : 11/120294
DATED : November 3, 2009
INVENTOR(S) : Penn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this

Twelfth Day of October, 2010

David J. Kappos
*Director of the United States Patent and Trademark Office*